May 27, 1969  A. W. MOSS ET AL  3,445,948
ELECTRICAL ILLUMINATION DEVICES
Filed June 6, 1966
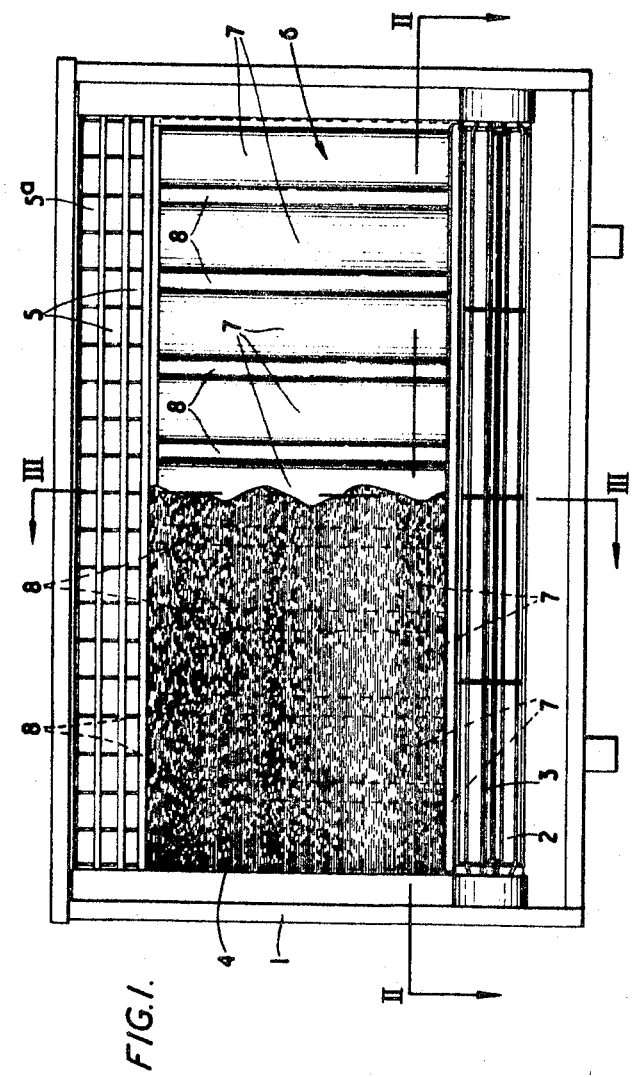
FIG.I.
Inventors:
Arthur William Moss
Norman Jones
Kenneth Carpenter
By

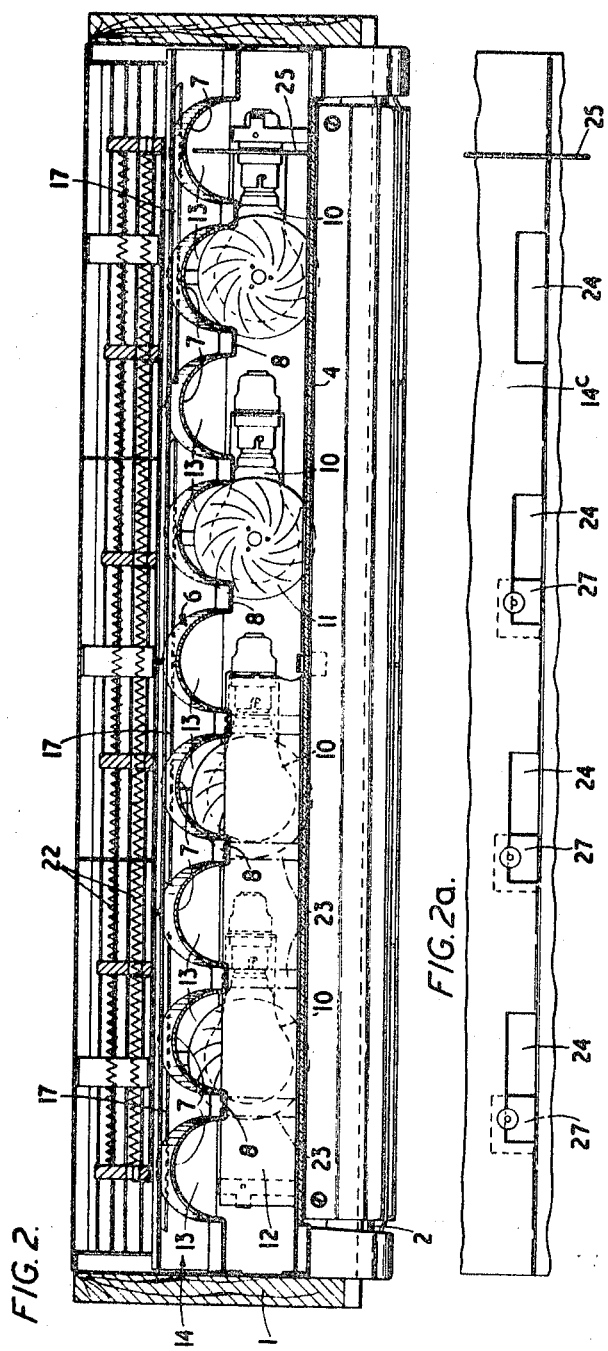

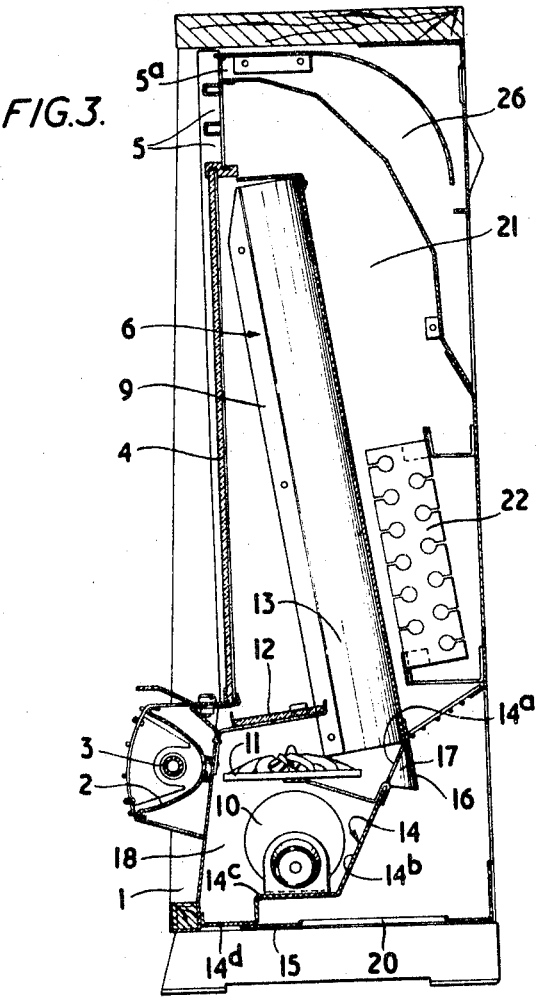
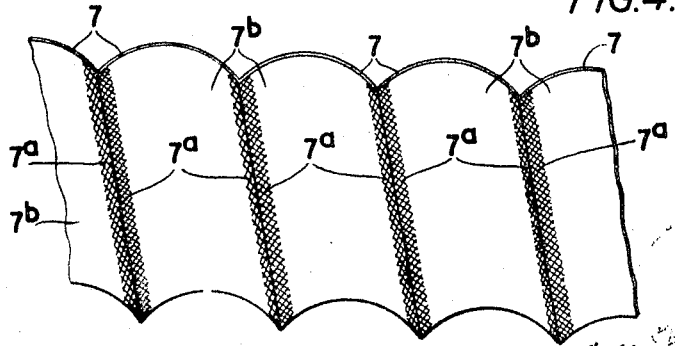

United States Patent Office 3,445,948
Patented May 27, 1969

3,445,948
ELECTRICAL ILLUMINATION DEVICES
Arthur William Moss, Painswick, and Norman Jones and Kenneth Carpenter, Walsall, England, assignors to H. Frost & Company Limited, Walsall, England, a British company
Filed June 6, 1966, Ser. No. 555,557
Claims priority, application Great Britain, June 8, 1965, 24,130/65
Int. Cl. G09f 13/34
U.S. Cl. 40—106.54                                    7 Claims

ABSTRACT OF THE DISCLOSURE

An electric illumination device comprising a light source including lamp means and light moving means in which moving light from said light source is viewed through a light-diffusing viewing screen while reflector means for reflecting light from the light source forward onto the rear face of the viewing screen comprises forwardly presented troughs each extending upwardly in its longitudinal direction and having a front reflecting surface with colored upwardly extending surface in interjacent relationship with said reflecting surfaces to contrast with the latter, said upwardly extending surfaces being illuminated from the light source so as to appear as colored illuminated strips in the lighting effect imparted by the device.

---

This invention relates to electrical illumination devices, and an object of the invention is to provide an electrical illumination device which can impart a novel and attractive lighting effect when in use.

According to the invention, an electrical illumination device comprises a light source formed by lamp means and flicker-producing or light-moving means, a light-diffusing viewing screen through which flickering or moving light from said light source is viewed, and reflector means for reflecting light from the light source forwards onto the rear face of the viewing screen, said reflector means comprising forwardly-presented troughs each extending upwardly in its longitudinal direction and having a front reflecting surface, there being, in interjacent relationship with the reflecting surfaces of the troughs, upwardly extending surfaces which contrast with the said reflecting surfaces of the troughs and give the appearance of stripes when the device is in operation, and the viewing screen and reflector means being placed so as to leave between them a space, beneath which the light source is situated, and up which some of the light is reflected forwards and backwards between the reflector means and the rear face of the viewing screen. There may be provided, in interjacent relationship with the troughs, a plurality of upwardly-extending lands, the front faces of which constitute faces contrasting with the reflecting surfaces of the troughs to give the appearance of stripes when the device is in operation. There may be one land between each of the troughs and the next. There may be provided, above the flicker-producing or light-moving means, an auxiliary light-diffusing screen which is arranged so as to diffuse light passing from the light source to the viewing screen without first being reflected at the reflector means, said auxiliary screen, however, allowing light from the light source to reach the reflector means without being diffused by said auxiliary screen. The viewing screen may be in the form of a panel having a light-diffusing surface formed thereon by producing on the panel a multiplicity of closely-adjacent, thin, horizontal or near-horizontal, broken or unbroken lines extending from one side to the other of the panel. The light source may comprise a plurality of lamp bulbs, and a plurality of flicker-producing devices, one to each bulb, said flicker-producing devices being operable by heated air from said bulbs and being protected against the effect of draughts by a shield, this shield having rear inlet means through which, in use, cooling air is drawn up over the front of the reflector means, and said shield having bottom air inlets disposed one beneath each lamp bulb. The said plurality of light bulbs associated with said shield may be spaced, aligned, horizontally-disposed bulbs all pointing in the same direction, and be associated with a baffle plate provided at one end of the line of bulbs, said bulbs pointing away from said baffle plate, and said baffle extending across air space protected by the shield.

FIGURE 1 of the accompanying drawings, shows, by way of example, a convenient embodiment of the invention, and is a front view of said embodiment, with a viewing screen thereof represented as if partly broken away, in order to show reflector means behind said screen.

FIGURE 2 is a horizontal cross-section along the line II—II of FIGURE 1 but on a larger scale than the latter, with an auxiliary screen shown as if partly broken away.

FIGURE 2a is a fragmentary view showing in plan, part of a shield provided in the embodiment illustrated.

FIGURE 3 is a vertical cross-section on the line III—III of FIGURE 1.

FIGURE 4 is a fragmentary view illustrating a modification.

Referring to the drawings, which show the appication of the invention to an electric heater having provision for producing both radiant and convected heat, the said heater comprises a box-like casing 1 along the front bottom portion of which is disposed a horizontally-extending trough-sectioned radiant-heat reflector 2 in front of which is a bar-type electric heating element 3. Disposed above this heat reflector 2, and closing the greater part of the front of the casing 1, is a flat, amber-colored, light-diffusing viewing screen 4 which, in this particular embodiment, is vertical. This screen 4 is, in the form of a panel having a light diffusing surface formed thereon by producing on the said panel a multiplicity of closely-adjacent, thin, horizotal or near-horizontal, broken or unbroken lines extending from one side of the panel to the other. The said lines are formed on the front face of the panel forming the screen 4. Slots 5 forming an air-outlet are provided above the top edge of the screen 4.

Disposed inside the casing 1, and spaced behind the screen 4, is a one-piece metal light-reflector 6 which is approximately the same length and height as the screen 4 and which is tilted forwards in an upwards direction at an angle, in this particular embodiment, of about 11½ degrees to the vertical. The screen 4 and the light reflector 6 are thus relatively-inclined to each other at an angle of about 11½ degrees and converge towards each other in an upwards direction. The said light-reflector 6 comprises a plurality of forwardly-presented troughs 7 each sloping upwardly in its longitudinal direction at the aforesaid angle which the reflector 6 makes with the vertical, and a plurality of upwardly-extending flat elongated lands 8 which are interjacent with the said troughs 7 and are disposed at the front of the reflector 6, there being, one land 8 between each two adjacent troughs 7. The front faces of the troughs 7 are of concave form and form polished reflecting surfaces, while the front faces of the flat lands 8, on the other hand, are finished in a red or like warm color which contrasts with the polished reflecting faces of the troughs 7. The lands 8 in this embodiment slope forward at the same angle as that of the reflector 6 as a whole.

Situated in the bottom portion of the casing 1, and vertically below the bottom end of the tapering space (shown at 9) between the reflector 6 and the screen 4, is a row of horizontal, aligned, horizontally-spaced clear-bulb type incandescent electric lamps 10, each lamp 10 having an amber-colored clear lacquered bulb and having a respective flicker-producing device 11 which is arranged, in known manner, above the bulb so as to be operated by ascending hot air from the latter. An elongated horizontal or slightly tilted light-diffusing screen 12, of white or uncolored plastics material, hereinafter called an auxiliary screen, is disopsed above the row of flicker-producing devices 11 but below the said space 9 between the reflector 6 and the viewing screen 4, said auxiliary screen 12 extending for substantially the entire length of the casing but having its rear edge separated from the front face of each trough 7 of the reflector 6 by a space 13 through which flickering light from the light source reaches the said reflector 6. This auxiliary screen 12 is thereby disposed so as to diffuse that part of the flickering light which passes directly to the rear face of the viewing screen 4 without first being reflected by the reflector 6, but so as to allow light from the light source to reach the reflector 6 without being diffused by said screen 12.

A metal shield plate 14 (FIGURE 3) is diposed between the bottom edge portion of the light-reflector 6 and a horizontal plate 15 closing the bottom of the casing, said shield plate 14 having a top edge portion 14a secured to the rear face of the bottom edge portion of the reflector 6, a forwardly and downwardly sloping portion 14b situtated behind the flicker-producing devices and the lamps, a horizontal portion 14c forming a platform for supporting the lamps, and a front attachment portion 14d. The upper part of this shield plate is slit and shaped to form louvres, such as that shown at 16, FIGURE 3, and so as to leave in the shield plate elongated rear openings 17 through which a cooling air current is drawn upwards over the front of the light reflector 6 when the device is in operation. The space (shown at 18) in which the lamps and flickering-producing devices are disposed is closed at the front, sides, bottom and rear except for the said louvred rear openings 17, and except for horizontally-spaced air inlets 24 disposed, in the shield portion 14c, one beneath each lamp 10. A vertical baffle plate 25 extends across the shield-protected space 18, between (as viewed in FIGURE 2) the right-hand end lamp 10 and the right-hand wall of the casing 1, the said plate 25 being thus sited so that the lamps 10 (which, in the embodiment shown, point to the left as viewed in FIGURE 2) point in a direction away from this plate 25. In the embodiment shown, utilising four lamps 10, three of the air inlets 24 are smaller than the right-hand outermost inlet 24, as shown in FIGURE 2a. The location of the baffle plate 25, and the location and relative sizes of the air inlets 24, are such as to inhibit any tendency for different ones of the flicker-producing devices 11 to rotate at different velocities, which might otherwise occur as a consequence of variations in the air flow over the reflector 6 and as a consequence of the horizontal disposition of the lamps 10. A convenient speed of rotation for the devices 11 is a speed of from 10 to 25 r.p.m. Conveniently, the four air inlets 24 may be provided, in the shield portion 14c, by first forming four spaced holes of equal size in said portion 14c, at the locations required, and then reducing the size of some of the holes by cover plates 27, as shown in FIGURE 2a. Air can flow to the louvred openings 17 through comparatively large air inlets, such as 20, in the bottom portion of the casing 1; and provided behind the light-reflector 6, and leading upwards from the inlets 20 to the hereinbefore mentioned air-outlet slot 5 above the viewing screen 4, is an air passage 21 housing heating element means 22 which is switch-controlled to give selectable heat outputs and which, when in use, causes a convection current of heating air to flow up through this passage 21, said heating air being discharged at the said air-outlet slots 5. A duct 26 for cooling air is provided at the top of the casing, and leads to a front discharge slot 5a.

When the illumination device is switched on, amber-colored flickering light from the light source comprised by the lamps 10 and the flicker-producing devices 11 passes up through the spaces 13 between the auxiliary screen 12 and the front faces of the troughs 7. Some of the said light is reflected once by the troughed portions 7 of the reflector and thence passes out through the viewing screen 4, and some is first reflected by the troughed portions 7 of the reflector 6 and is then reflected back onto the reflector 6 by the rear face of the viewing screen 4, being then further reflected one or more times, this multi-reflected portion of the light thus, after it has first struck the reflector 6, being reflected backwards and forwards up the space 9 between the reflector 6 and the screen 4. The resultant lighting effect, as visible to a person viewing the device from the front, is that of a moving heat effect attractively combined with the appearance of colored stripes resulting from the provision of the colored lands 8 between the troughs 7 of the reflector.

The auxiliary screen 12 has on its top face, in the embodiment shown, a series of colored stripes 23 (FIGURE 2) the rear ends of which register with the bottom ends of respective ones of the lands 8 of the reflector.

The viewing screen 4 may be of an acrylic plastics material.

If desired, instead of there being lands 8 between the troughs 7, the reflector may be modified as illustrated in FIGURE 4. In this modification, the troughs 7 directly adjoin each other and have upwardly-extending marginal portions 7a of their concave front faces, finished in a color contrasting with concave reflecting surfaces 7b of the said front faces of troughs.

If desired, the light from the lamps may be of any other suitable color; and only one lamp may be provided, although it is preferred to provide a plurality of lamps.

Instead of the reflector being made in one piece, it may be formed by a plurality of pieces secured or placed together.

If desired, the provision of heating elements, for producing radiant and/or convected heat may be omitted, and the device may be provided solely as an illumination device.

We claim:
1. An electric illumination device comprising a light source including lamp means and light moving means, a light diffusing viewing screen through which moving light from said light source is viewed, reflector means for reflecting light from the light source forward onto the rear face of the viewing screen, said reflector means comprising forwardly-presented troughs each extending upwardly in its longitudinal direction and having a front reflecting surface, means including upwardly extending surfaces in interjacent relationship with said reflecting surfaces of said troughs, said upwardly extending surfaces being colored to contrast with the said reflecting surfaces of the troughs and when the device is in operation being illuminated from the light source so as to appear as colored illuminated stripes in the lighting effect imparted by the device, the viewing screen and reflector means being placed so as to leave between them a space beneath which the light source is situated and up which some of the light is reflected forward and backward between the reflector means and the rear face of the viewing screen.

2. An electrical illumination device, according to claim 1, wherein there is provided, in interjacent relationship with the troughs, a plurality of upwardly-extending lands, the front faces of which constitute faces contrasting with the reflecting surfaces of the troughs to give the appearance of stripes when the device is in operation.

3. An electrical illumination device, according to claim 2, wherein there is one land between each of the troughs and the next.

4. An electrical illumination device, according to claim 1, wherein there is provided, above the light-moving means, an auxiliary light-diffusing screen which is arranged so as to deffuse light passing from the light source to the viewing screen without first being reflected at the reflector means, said auxiliary screen, however, allowing light from the light source to reach the reflector means without being diffused by said auxiliary screen.

5. An electrical illumination device, according to claim 1, wherein the viewing screen is in the form of a panel having a light-diffusing surface formed thereon by producing on the panel a multiplicity of closely-adjacent, thin, substantially horizontal lines extending from one side to the other of the panel.

6. An electrical illumination device, according to claim 4, wherein the light source comprises a plurality of lamp bulbs, and a plurality of flicker-producing devices, one to each bulb, said flicker-producing devices being operable by heated air from said bulbs and being protected against the effect of drafts by a shield, this shield having rear inlet means through which, in use, cooling air is drawn up over the front of the reflector means, and said shield having bottom air inlets disposed one beneath each lamp bulb.

7. An electric illumination device, according to claim 6, wherein the light bulbs are spaced, aligned, horizontally-disposed bulbs all pointing in the same direction and a baffle plate is provided at one end of the line of bulbs, said bulbs pointing away from said baffle plate, and said baffle extending across air space protected by the shield.

References Cited

UNITED STATES PATENTS

| 1,655,987 | 1/1928 | Dickerson | 40—106.54 X |
| 2,028,662 | 1/1936 | Hansman | 40—106.54 |
| 2,131,410 | 9/1938 | Newton | 40—106.54 |

FOREIGN PATENTS

| 413,293 | 7/1934 | Great Britain. |
| 414,280 | 8/1934 | Great Britain. |
| 957,591 | 5/1964 | Great Britain. |

EUGENE R. CAPOZIO, *Primary Examiner.*

RICHARD CARTER, *Assistant Examiner.*